United States Patent
Schletter et al.

(10) Patent No.: US 9,506,238 B2
(45) Date of Patent: Nov. 29, 2016

(54) DEVICE FOR FIXING A RAIL

(71) Applicant: SCHLETTER GMBH, Kirchdorf (DE)

(72) Inventors: Ludwig Schletter, Haag (DE); Stefan Madlindl, Muehldorf (DE); Gabriel Dechant, Gstadt (DE)

(73) Assignee: SCHLETTER GMBH, Kirchdorf (DE)

( * ) Notice: Subject to any disclaimer, the term of this patent is extended or adjusted under 35 U.S.C. 154(b) by 145 days.

(21) Appl. No.: 14/383,107

(22) PCT Filed: Mar. 6, 2013

(86) PCT No.: PCT/DE2013/000119
§ 371 (c)(1),
(2) Date: Sep. 5, 2014

(87) PCT Pub. No.: WO2013/131509
PCT Pub. Date: Sep. 12, 2013

(65) Prior Publication Data
US 2015/0050074 A1  Feb. 19, 2015

(30) Foreign Application Priority Data
Mar. 6, 2012 (DE) .......................... 20 2012 002 174

(51) Int. Cl.
*F16B 9/00* (2006.01)
*E04B 1/24* (2006.01)
(Continued)

(52) U.S. Cl.
CPC ............... *E04B 1/2403* (2013.01); *E04B 1/24* (2013.01); *E04D 12/004* (2013.01);
(Continued)

(58) Field of Classification Search
CPC ...................... E04B 1/2403; E04B 2001/2433; E04B 2001/2457; E04B 2001/2424; E04B 2001/2448; E04B 2001/2415; F16B 7/0473; F16B 7/0493; F24J 2/526; F24J 2/5205; F24J 2/5232; F24J 2002/5218; F24J 2002/5213; Y10T 403/7064; Y10T 403/39; Y10T 403/7066; Y10T 29/49959; E04D 12/004
USPC ......... 403/187, 188, 374.1, 400, 374.2, 387, 403/373; 29/525.08; 52/710, 711, 712, 713, 52/714, 715
See application file for complete search history.

(56) References Cited

U.S. PATENT DOCUMENTS

| 1,332,442 A | 3/1920 | Kane |
| 5,544,395 A | 8/1996 | Rosenvinge |

(Continued)

FOREIGN PATENT DOCUMENTS

| EP | 0 391 048 A2 | 10/1990 |
| FR | 2 572 112 A1 | 4/1986 |
| WO | WO 93/15622 A1 | 8/1993 |

*Primary Examiner* — Chi Q Nguyen
(74) *Attorney, Agent, or Firm* — Norman B. Thot (57) ABSTRACT

A device for affixing a rail which has a fastening flange. The device includes a retaining plate having a notch and a clamping device. The notch has a front opening, a first edge portion, a second edge portion, and a third edge portion. The second edge portion and the third edge portion face each other. When the rail is inserted into the notch via the fastening flange, the rail penetrates and crosses the retaining plate and protrudes out of the notch through the front opening, the fastening flange is supported on the first edge portion, the clamping device jams between the fastening flange and the second edge portion and presses the fastening flange against the first edge portion, and the third edge portion acts as a stop so as to block the rail from escaping from the notch in a direction parallel to the first edge portion.

19 Claims, 10 Drawing Sheets

(51) Int. Cl.
 *E04D 12/00* (2006.01)
 *F16B 7/04* (2006.01)
 *F16B 7/18* (2006.01)
 *F24J 2/52* (2006.01)

(52) U.S. Cl.
 CPC .......... *F16B 7/0446* (2013.01); *F16B 7/0473* (2013.01); *F16B 7/18* (2013.01); *F24J 2/5205* (2013.01); *F24J 2/526* (2013.01); *F24J 2/5232* (2013.01); *E04B 2001/2415* (2013.01); *E04B 2001/2424* (2013.01); *E04B 2001/2433* (2013.01); *E04B 2001/2448* (2013.01); *E04B 2001/2457* (2013.01); *F16B 7/0493* (2013.01); *F24J 2002/5213* (2013.01); *F24J 2002/5218* (2013.01); *Y02E 10/47* (2013.01); *Y10T 29/49959* (2015.01); *Y10T 403/39* (2015.01); *Y10T 403/3906* (2015.01); *Y10T 403/7064* (2015.01); *Y10T 403/7066* (2015.01)

(56) References Cited

U.S. PATENT DOCUMENTS

| | | | | |
|---|---|---|---|---|
| 5,692,272 | A * | 12/1997 | Woods | A44B 99/00 24/115 M |
| 7,004,943 | B2 * | 2/2006 | Ferrante | A61B 17/645 606/59 |
| 7,509,713 | B2 * | 3/2009 | Lewis | F16B 2/16 24/488 |
| 7,636,986 | B2 * | 12/2009 | Sorensen | B60P 7/0823 24/129 A |
| 7,992,752 | B2 * | 8/2011 | Oetlinger | B26D 7/1818 225/104 |
| 8,651,725 | B2 * | 2/2014 | Ie | G02B 6/0045 362/607 |
| 2002/0061225 | A1 * | 5/2002 | Boucher | F16B 2/185 403/386 |

* cited by examiner

DEVICE FOR FIXING A RAIL

CROSS REFERENCE TO PRIOR APPLICATIONS

This application is a U.S. National Phase application under 35 U.S.C. §371 of International Application No. PCT/DE2013/000119, filed on Mar. 6, 2013 and which claims benefit to German Patent Application No. 20 2012 002 174.5, filed on Mar. 6, 2012. The International Application was published in German on Sep. 12, 2013 as WO 2013/131509 A1 under PCT Article 21(2).

FIELD

The present invention relates to a device for fixing a rail, for example, a roll-formed rail with a Z-shaped cross section.

BACKGROUND

EP 0 391 048 A2 describes a device for fixing a rail which is roll-formed from steel and has a Z-shaped cross section. The rail is screwed at the diagonal central web thereof to the device.

SUMMARY

An aspect of the present invention is to provide a device of the type mentioned above on which the rail can be mounted simply, rapidly and securely. The fastening with the device is intended to tolerate high loading. The device is additionally intended to be particularly simple to manufacture.

In an embodiment, the present invention provides a device for affixing a rail comprising a first fastening flange, the device including a retaining plate comprising a notch and a screwless clamping device. The notch comprises a front opening, a first edge portion, a second edge portion, and a third edge portion. The second edge portion and the third edge portion are arranged to face each other. When the rail is inserted into the notch via the first fastening flange, the rail penetrates and crosses the retaining plate and protrudes out of the notch through the front opening, the first fastening flange is supported on the first edge portion, the screwless clamping device is configured to jam between the first fastening flange and the second edge portion and to press the first fastening flange against the first edge portion, and the third edge portion acts as a stop so as to block the rail from escaping from the notch in a direction parallel to the first edge portion.

BRIEF DESCRIPTION OF THE DRAWINGS

The present invention is described in greater detail below on the basis of embodiments and of the drawings in which.

DETAILED DESCRIPTION

In an embodiment, the present invention provides a device for fixing a rail, in particular, a roller-formed rail with a Z-shaped cross section, wherein the rail has a fastening flange. The device comprises a retaining plate. The retaining plate contains a notch with a front opening. The rail is inserted into the notch via the fastening flange so as to penetrate and cross the retaining plate so that the rail protrudes out of the notch through the front opening. The notch has a first edge portion, a second edge portion, and a third edge portion, wherein the second edge portion faces the first edge portion, and the fastening flange is supported on the first edge portion. A screwless clamping device is provided, the screwless clamping device jamming between the fastening flange and the second edge portion, and thereby pressing the fastening flange against the first edge portion. The third edge portion acts as a stop which blocks the rail from escaping from the notch in a direction parallel to the first edge portion.

Rails which are manufactured from roll-formed or cold-rolled steel strip or flat steel frequently do not have undercut fastening grooves or suitable fastening edges so that such rails are not readily fastenable in a screwless manner. This is particularly true of rails with a Z-shaped cross section.

Via the device according to the present invention, such rails can be fastened in an easily mountable and nevertheless in a highly stable manner. The device can be produced with few components and in a manner suitable for manufacturing. The device may thus consist of just two components which are simple to produce: the retaining plate with the integrated notch, and the screwless clamping device.

In an embodiment of the present invention, the screwless clamping device can, for example, be a wedge which can be driven by a translatory movement between the fastening flange of the rail and the second edge portion of the notch. Such a wedge can be produced in a manner suitable for manufacturing, for example, in the form of an extruded part or, for example, in the form of a deep-drawn part.

In an embodiment of the present invention, the retaining plate can, for example, be formed integrally as a single piece and/or be made of metal. It may, for example, be a simple punched part made of steel. The retaining plate can, for example, be designed so as to be flat or plane-parallel. The retaining plate can be a steel plate with a thickness of a few millimeters. The notch can be removed from the retaining plate by customary methods, such as by punching or cutting. At one position, the notch interrupts the narrow edge or the outer contour of the retaining plate via a front opening. In the plane of the retaining plate, the notch can, for example, be more deep than wide and can therefore also generally be referred to as a recess with a front opening.

The retaining plate can be arranged in a positionally fixed manner on a supporting component, for example, on a support or a supporting rail. The type of fastening of the retaining plate to the supporting component can, for example, be a weld connection, a screw connection, a rivet connection, or a clamping connection.

The device can, for example, be suitable for rails which are manufactured from roll-formed steel and/or have a Z-shaped cross section. A Z-shaped cross section is characterized by two, for example, parallel flanges, an upper flange and a lower flange, which are integrally connected by a central web which is diagonal thereto. Such a Z-shaped cross section has a resemblance to or is similar to a letter Z.

The fastening flange is an integral part of the rail and can, for example, be continuous longitudinally, i.e., is not interrupted. Other terms for the fastening flange may be a fastening strip, a fastening web, or a fastening chord. In the case of a Z-shaped cross section, the fastening flange can be one of the two parallel flanges, for example, the lower flange with respect to gravity, and therefore the rail can be supported in the device due to gravity. A suspended arrangement, in which the rail is suspended in the device, is also conceivable.

The mounting of the rail on the device is simple. After the rail is inserted and optionally positioned in the retaining plate, that is to say, more precisely, in the notch of the retaining plate, the screwless clamping device is driven in between the fastening flange and the second edge portion. During the driving-in operation, the screwless clamping device jams between the fastening flange and the second edge portion.

A further advantage in terms of mounting arises in that the rail is already provisionally held in the retaining plate before the driving-in operation, and also even before any insertion of the screwless clamping device, via the third edge portion, which acts as a stop, so that the fastening flange is blocked from escaping or sliding out of the front opening of the notch in a direction parallel to the first edge portion. This is advantageous if the retaining plate is fastened in a fixed position so that the first edge portion is oriented in a sloping manner toward the front opening. Such an orientation frequently occurs in conjunction with the inclined mounting of solar modules. The notch in the manner of an open slot can, for example, be narrow enough so that the rail cannot tilt out of the notch upon rotation about a pivot point in the region of the third edge portion.

In an embodiment of the present invention, the screwless clamping device can, for example, act via a wedge. The screwless clamping device can consist of exactly one wedge for this purpose. The latter can be driven in between the fastening flange and the second edge portion, for example, using a hammer, tongs, or a mechanical driving-in device. The driving-in direction can, for example, be parallel to the rail. For simpler mounting and/or for a better distribution of force, multiple wedges and combinations with plates or other flat bodies which are part of the screwless clamping device are also conceivable.

A wedge surface of the wedge can be adjacent to a locking depression. Such a locking depression can interact with the second edge portion. The wedge is held securely in an end position via the second edge portion engaging into the locking depression, and a consistent clamping force within the scope of dimensional tolerances is always produced.

In an embodiment of the present invention, the locking depression can, for example, be adjacent to a stop which blocks the wedge from being driven in further beyond the locking depression. The stop can interact with the retaining plate in the region of the second edge portion.

The notch can have a stop which blocks a movement of the wedge away from the front opening or deeper into the notch to prevent the wedge from sliding in the notch.

In an embodiment of the present invention, the screwless clamping device can, for example, act via an eccentric or an eccentric shaped component. Such an eccentric can be actuated with the aid of a lever and can be mounted pivotably on an additional supporting plate which is part of the screwless clamping device. A locking depression can be contained in the second edge portion to lock the eccentric in an end position. A rotary guide on the second edge portion and a locking depression in the rail or in the optional supporting plate are likewise conceivable. An end stop can be provided to block a rotation of the eccentric beyond the locking depression. A positional securing device can be provided to block an undesirable movement of the eccentric or of a supporting body in a direction away from the front opening, i.e., deeper into the notch.

In the case of a screwless clamping device acting via an eccentric, it is also possible for the second edge portion to have an eccentric shape and to interact with a roll-shaped body. The roll-shaped body here constitutes the screwless clamping device and can be actuated via a lever. The roll-shaped body can be mounted pivotably, as previously described, on the rail or on a separate supporting body.

The screwless clamping device can alternatively also act via an expanding body in which a swellable material is contained which is activatable in a controlled manner. Such a material can, for example, be a liquid-absorbing polymer which, through addition of a liquid, greatly increases in volume. It is conceivable to integrate the liquid via an openable capsule on the expanding body. Materials which expand greatly in terms of volume via heating or current feed are also conceivable.

In an embodiment of the present invention, the third edge portion can, for example, partially engage over the rail with respect to the first edge portion. A lifting off of the rail perpendicular with respect to the first edge portion is thereby blocked. It is expedient here if the fastening flange is secured in the notch not only frictionally, but also in a form-fit manner, against slipping parallel to the second edge portion. Provision may be made for this purpose for an elevation or depression in the first edge portion to engage in a reinforcing bead of the fastening flange. It is also possible for the screwless clamping device and, via the screwless clamping device, the rail, in turn to be secured against slipping parallel to the first edge portion. A screwless clamping device can in particular be secured in position in a form-fit manner on a reinforcing bead and, for this purpose, can have an indentation on the lower side thereof. It is advantageous for the rail to be engaged over if high tensile forces act in a lifting manner with respect to the first edge portion. In the event of a Z-shaped cross section, the third edge portion can bear, at least in a region, for example, in an end region toward the front opening, against the diagonal central web in an approximately parallel manner.

In an embodiment of the present invention, the notch can, for example, be matched to the fastening flange so that the rail can be inserted with the fastening flange ahead, i.e., frontally through the front opening into the notch. This facilitates mounting since the retaining plate must otherwise be pushed over one of the longitudinal ends of the rail, or conversely, the rail must be slid longitudinally through the retaining plate as far as the desired mounting position. At least one insert slope can be provided on a region on the outside toward the front opening for simpler insertion of the rail.

In an embodiment of the present invention, the rail can, for example, be inserted by the fastening flange frontally through the front opening of the notch exclusively with a combined pivoting and sliding movement. The recess can therefore be small, and the retaining plate can be designed in a material-efficient manner. An unintentional release of the rail is additionally made more difficult, which additionally increases mounting security.

The device is particularly suitable for rails with a Z-shaped cross section. Such a cross section is characterized by a further fastening flange, wherein the two fastening flanges can, for example, run parallel to each other and are integrally and diagonally connected via a central web.

The present invention also relates to a rail cross connection with the previously described device, wherein a supporting rail is provided, which supporting rail crosses the rail, and to which the retaining plate is fastened. The retaining plate can, for example, be arranged parallel to the supporting rail and only on one side thereof. The supporting rail can be arranged in a fixed position and inclined longitudinally, wherein the rail can, for example, run over the supporting rail, and the retaining plate is oriented vertically. In the case of such a rail cross connection, the second edge portion can, for example, run parallel to the supporting rail.

The present invention also relates to a method for producing the previously described rail cross connection. Such a method has the following steps: a) fastening the retaining plate to the supporting rail, b) inserting the rail so that the fastening flange is supported on the first edge portion, c) positioning the screwless clamping device between the fastening flange and the second edge portion, and d) actuating the screwless clamping device.

A high degree of pre-mounting is permitted if between step a) and b) the supporting rail together with the retaining plate fastened thereto are brought to a building site, for example, from a pre-mounting location closer to the final manufacturing step.

A particularly convenient type of mounting arises if step b) takes place by the rail with the fastening flange being inserted frontally through the front opening. This avoids the retaining plate being slid onto the rail or the rail being pushed for relatively long lengths through the retaining plate as far as the desired fastening position.

Three exemplary embodiments of the present invention are explained in more detail below with reference to drawings.

FIG. 1 to FIG. 4 show a device which fastens a rail 1 with a Z-shaped cross section to a supporting rail 60. The rail 1 crosses the supporting rail 60 and runs over the latter with respect to gravity. Both the rail 1 and the supporting rail 60 are rails which are roll-formed from a steel. The supporting rail 60 is arranged in a positionally fixed manner (not apparent specifically) and inclined longitudinally.

The rail 1 has a lower fastening flange 2 and an upper fastening flange 3, which run parallel to each other here. A central web 4, via which the fastening flanges 2 and 3 are integrally connected, runs diagonally between the fastening flanges 2 and 3. The fastening flanges 2 and 3 and the central web 4 are substantially similar in cross section to the shape of a Z.

The device has a retaining plate 10. The retaining plate 10 which consists of a flat steel plate is fastened to a vertical outer side of the supporting rail 60 by two screws 9. The retaining plate 10 runs parallel to the supporting rail 60 and is oriented vertically.

The retaining plate 10 contains a notch 11 with an front opening 12. In the plane of the drawing according to FIG. 1, the notch 11 completely penetrates the retaining plate 10 and has a first edge portion 14, a second edge portion 15, and a third edge portion 16. The first edge portion 14 and the second edge portion 15 face parallel to each other and are parallel to the supporting rail 60.

Figure 1:
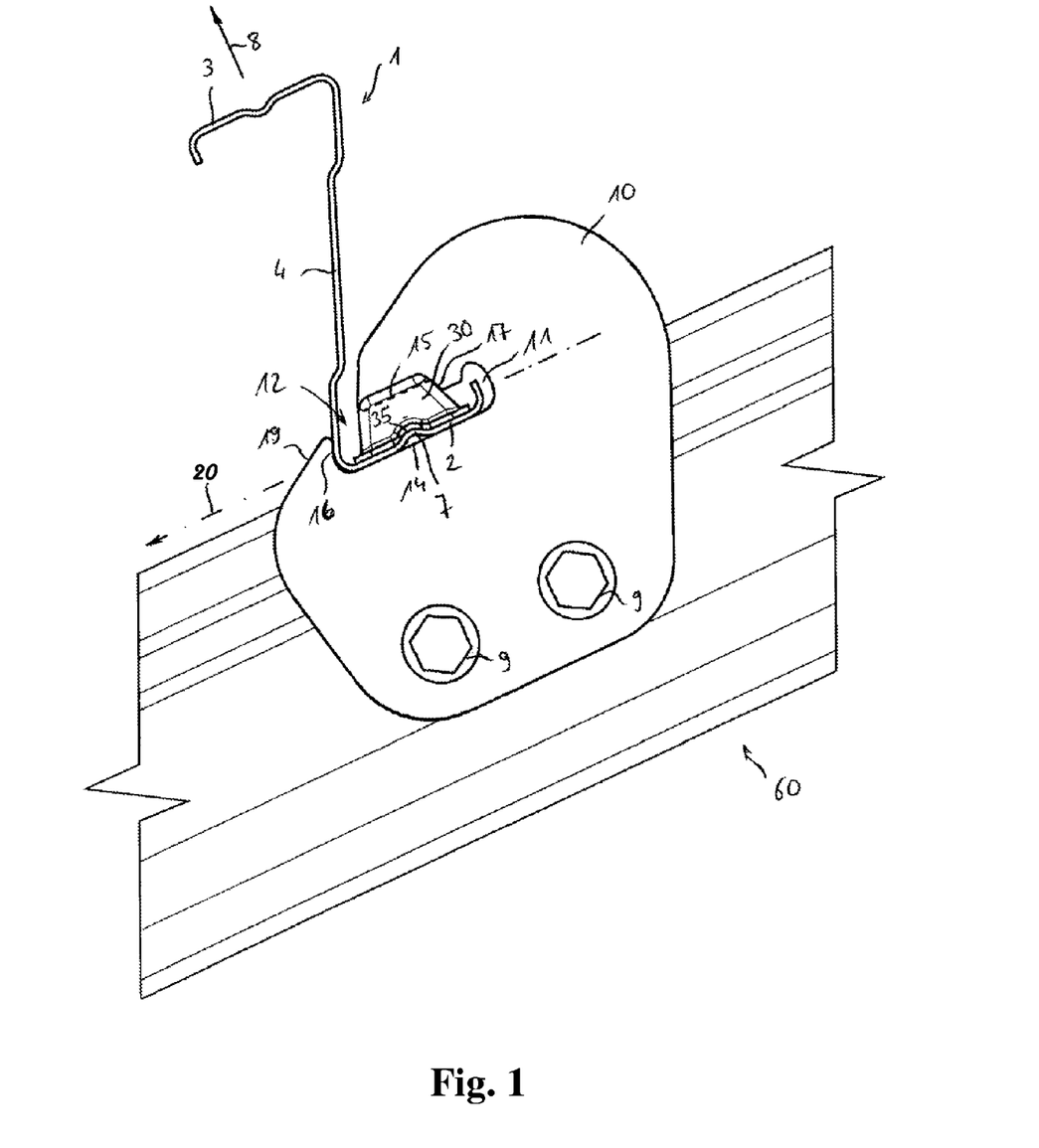
FIG. 1 shows a side view of a device which connects a rail with a Z-shaped cross section to a supporting rail in a crossing manner.
Figure 2:
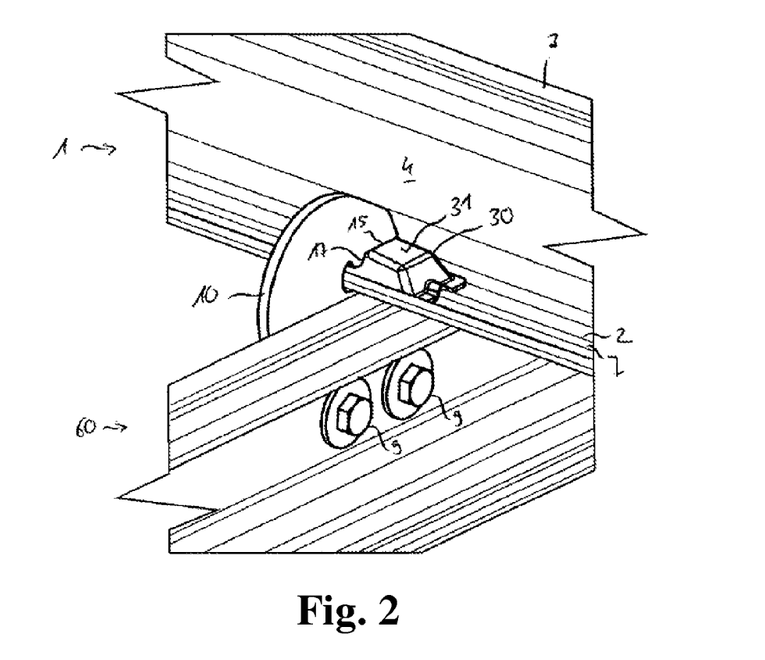
FIG. 2 shows a perspective of the device according to FIG. 1.
Figure 3:
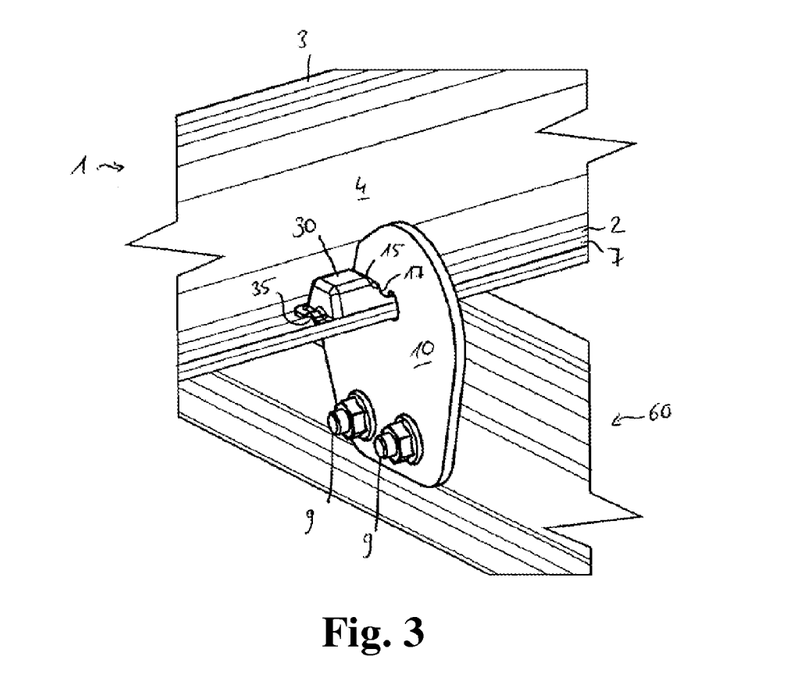
FIG. 3 shows a perspective of the device according to FIG. 1.
Figure 4:
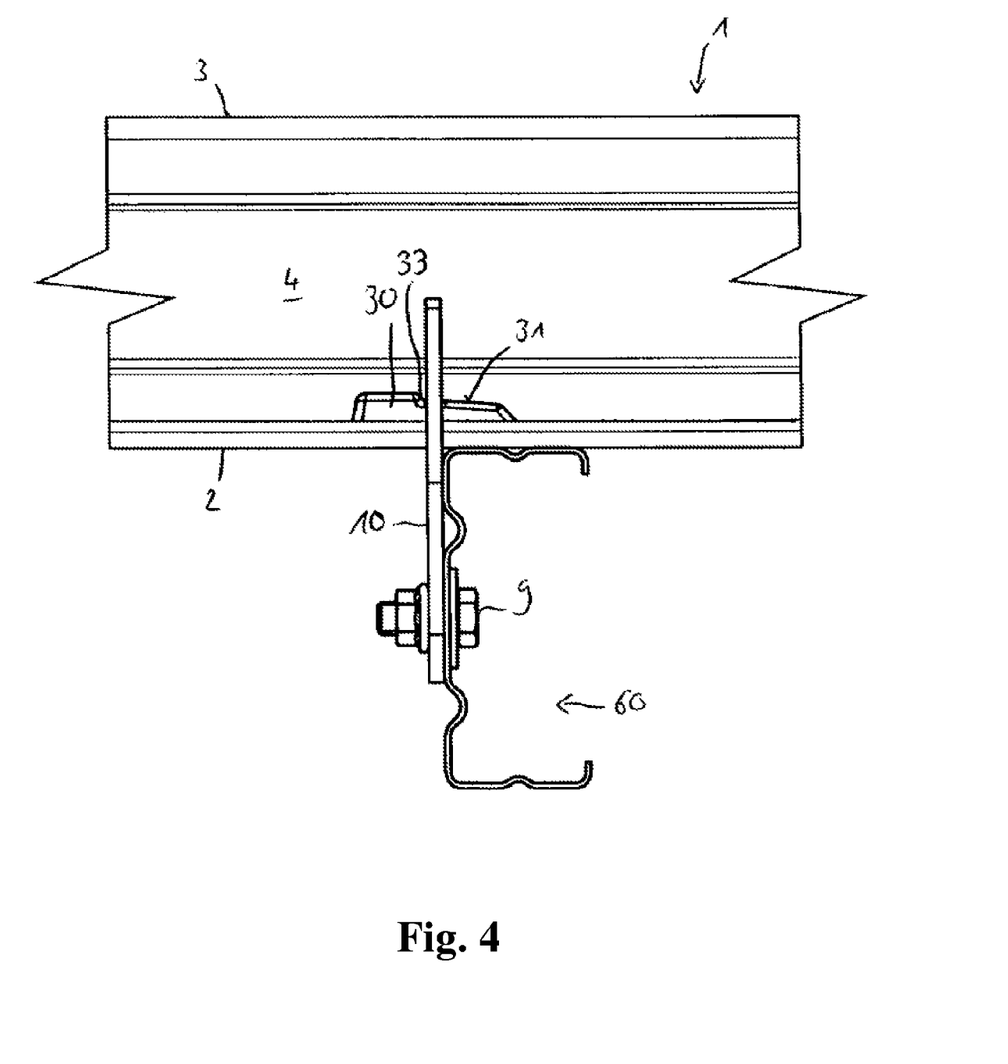
FIG. 4 shows a rear view of the device according to FIG. 1.

The rail 1 is inserted with its lower fastening flange 2 into the notch and here penetrates the retaining plate 10 in a crossing manner. In addition, it can be seen that the rail 1 protrudes from the notch through the front opening 12. The notch 11 virtually completely surrounds the lower fastening flange 2 in a C-shaped manner. The lower fastening flange 2 is supported by the lower side thereof on the first edge portion 14. It can be seen that the first edge portion 14 and the second edge portion 15 are disposed on different sides of the lower fastening flange 2 and therefore face each other, as mentioned previously.

The device additionally has a screwless clamping device which, in this exemplary embodiment, is designed as a wedge 30 and can also be referred to as a wedge body. The wedge 30 jams upon being driven in between the upper side of the lower fastening flange 2 and the second edge portion 15 and thereby presses the lower fastening flange 2 against the first edge portion 14. For this purpose, the wedge 30 is driven in parallel to the rail 1, for example, with a hammer or tongs.

The wedge 30 has a wedge surface 31. The wedge surface 31 is adjacent to a locking depression 32. The locking depression 32 interacts with the second edge portion 15. By the second edge portion 15 engaging into the locking depression 32, the wedge 30 is securely held in an end position, and a consistent clamping force within the scope of dimensional tolerances is always produced. In the driving-in direction, the locking depression 32 is provided approximately centrally on the wedge 30, and therefore the second edge portion 15 approximately centrally loads the wedge 30 in the locked state, and the pressing power is distributed uniformly over the lower fastening flange 2.

The wedge 30 also has a stop 33. The stop 33 is adjacent to the locking depression 32 opposite the wedge surface 31. The stop 33 blocks the wedge 30 from being driven in beyond the locking depression 32. In the exemplary embodiment, the wedge 30 is designed as a deep-drawn part and is hollow on the inside and open on the rear side (which cannot be seen in the drawings).

The third edge portion 16 acts as a stop which blocks the rail 1 from escaping from the notch 11 in a direction 20 parallel to the first edge portion 14. It is also provided that the third edge portion 16 partially engages over the rail 1 with respect to the first edge portion 14. For this purpose, the third edge portion 16 abuts against the central web 4 in an approximately parallel manner. As a result, a lifting off 8 of the rail 1 perpendicular with respect to the first edge portion 14 is blocked. Particularly high tensile forces can thereby act on the rail 1 without the rail 1 being able to be released from the device. The retaining plate 10 can be seen like a nose in the region of the third edge portion 16.

In order to prevent an unintentional slipping of the wedge 30 in the notch 11 during or after driving in of the wedge 30, the notch 11 has a stop 17 which, in an form-fit manner, blocks a movement of the wedge 30 away from the front opening or deeper into the notch 11. Since the wedge 30 abuts with a rectilinear side edge against the round corner region between the lower fastening flange 2 and the central web 4, the rail 1 is also secured by the wedge 30 against such slipping. In addition, for the positional securing of the rail 1 by the wedge 30, it is provided that a reinforcing bead 7 in the lower fastening flange 2 engages in a shape-corresponding manner in an indentation 35 on the lower side of the wedge 30. Provision may also be made for the first edge portion 14 to have an elevation which engages in the reinforcing bead 7 for positional securing purposes.

Figure 5:
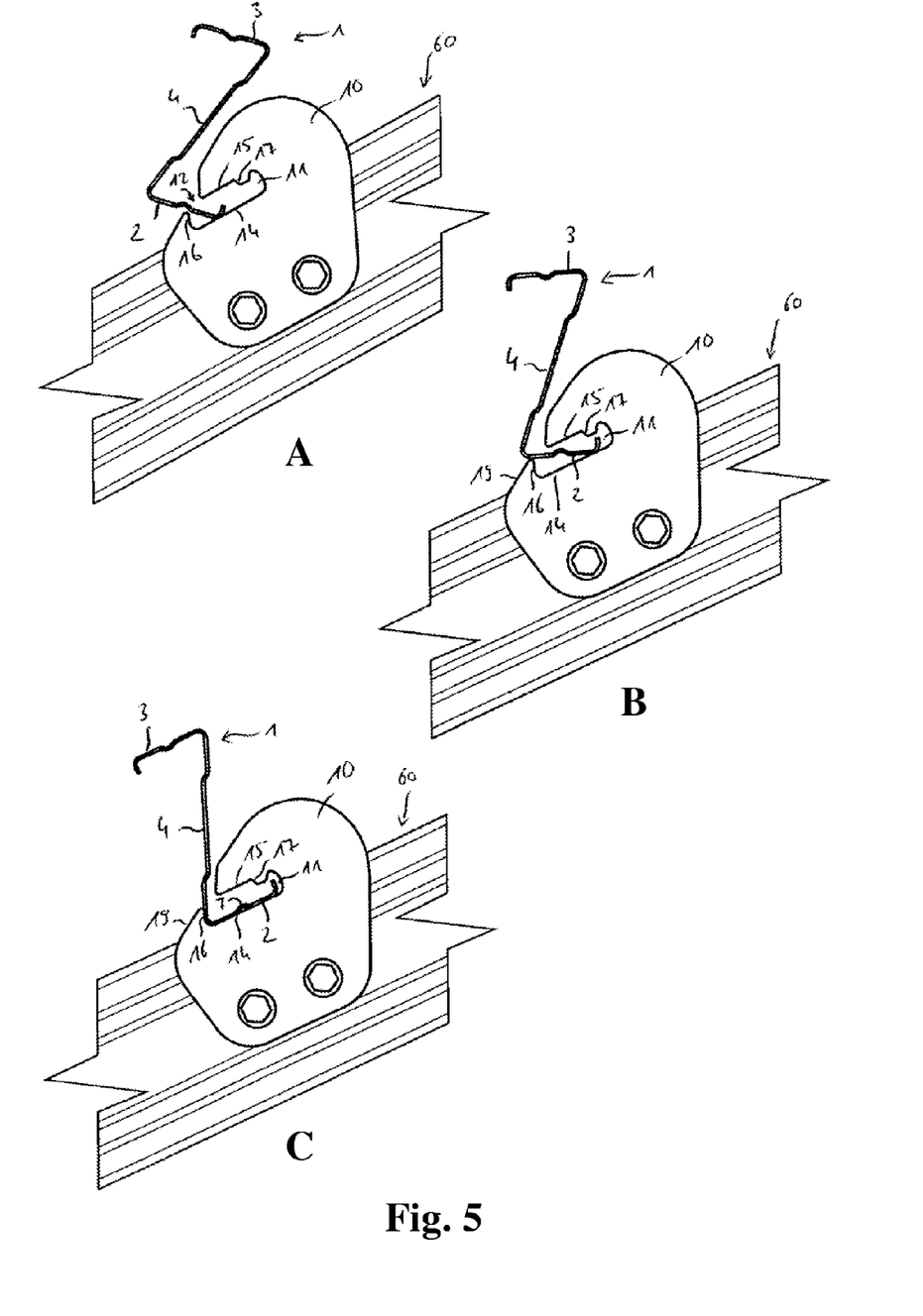
FIG. 5 shows a sequence A-C of the rail with the Z-shaped cross section being inserted into the device according to FIG. 1.
Figure 6:
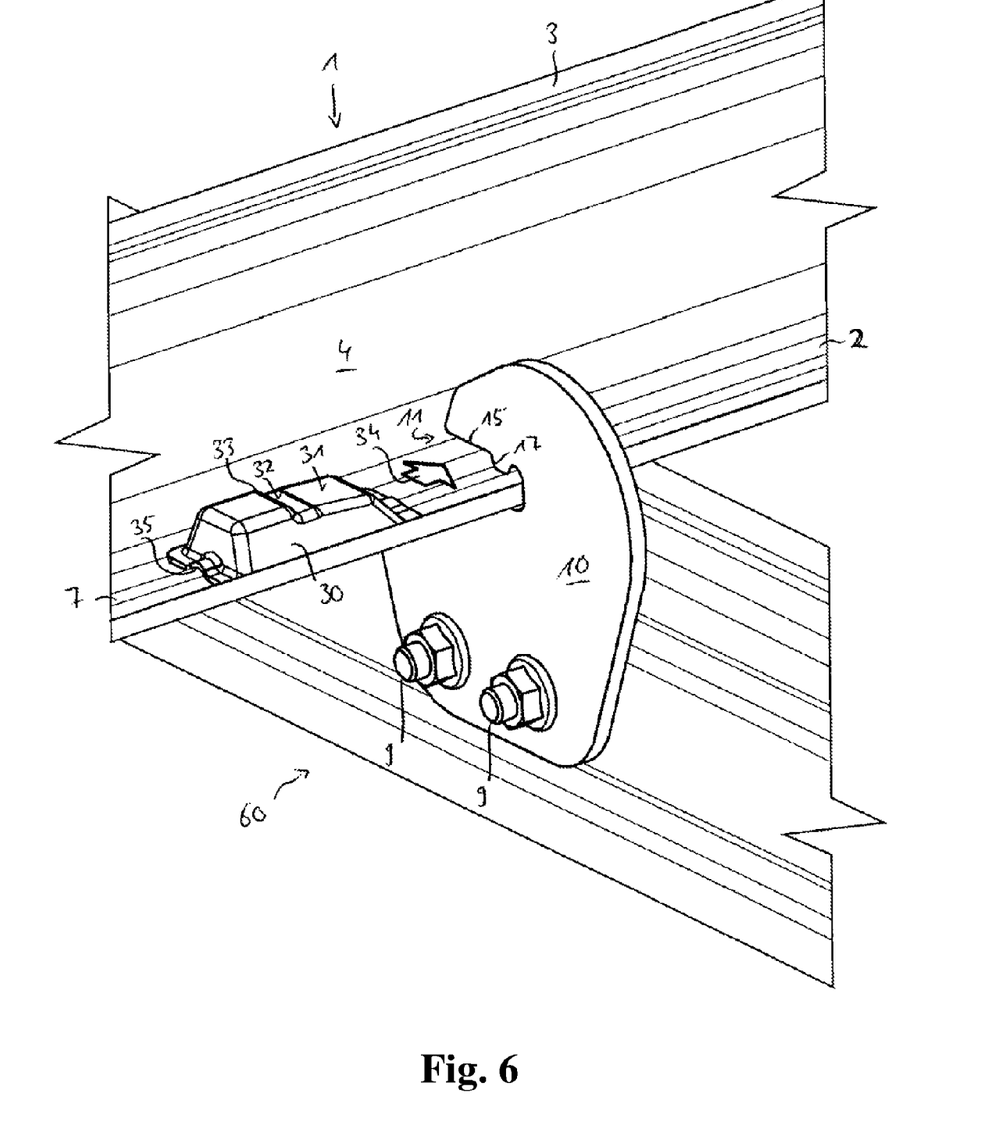
FIG. 6 shows a perspective of the device according to FIG. 1 in the unclamped state.

It can be seen from FIG. 5 with reference to the sequence A-C that the notch 11 is matched to the lower fastening flange 2 so that the rail 1 can be inserted with the lower fastening flange 2 frontally through the front opening 12 into the notch 11 with only a combined pivoting and sliding movement. For simpler insertion of the rail 1 with the lower fastening flange 2 in front, an insert slope 19 is provided in a region from the outside toward the front opening 12. The insert slope 19 and the third edge portion 16 together form a nose shape. In the end position, the rail 1, because of the sloping down force thereof, bears against the third edge portion 16. In a final mounting step, the wedge 30 according to FIG. 6 is placed onto the lower fastening flange 2 and driven in with a sliding movement 34 between the lower fastening flange 2 and the second edge portion 15.

Figure 7:
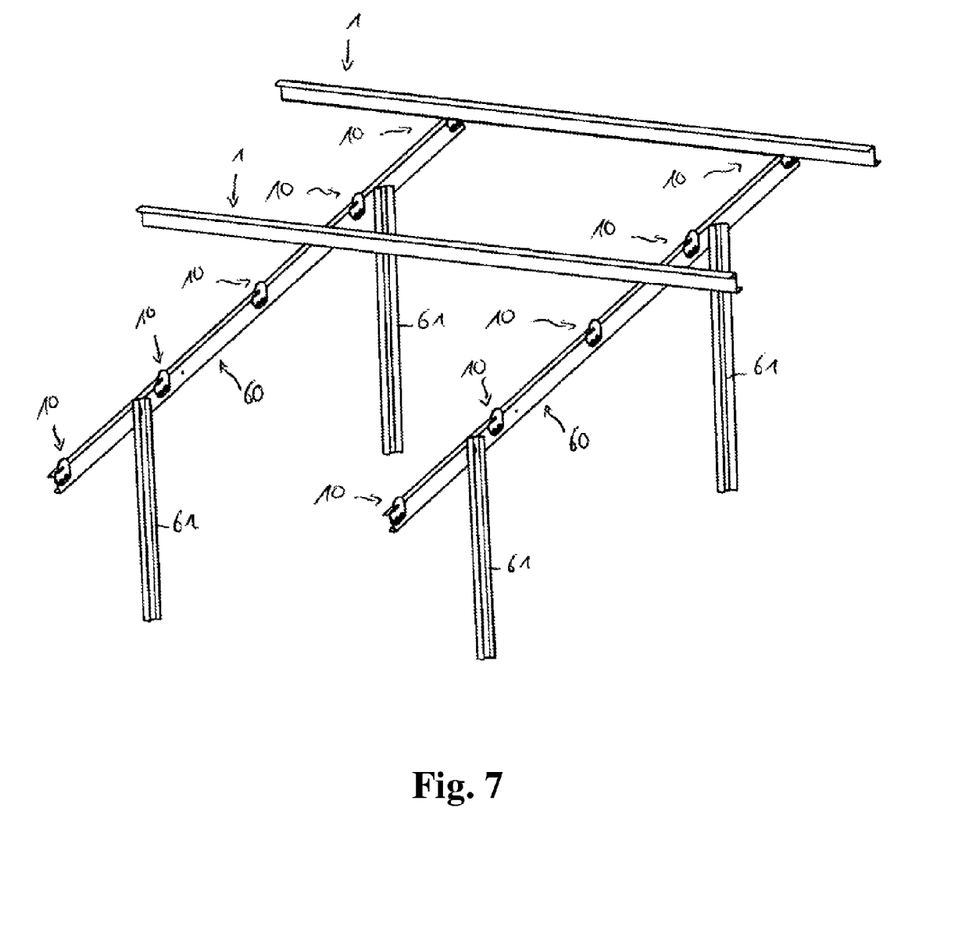
FIG. 7 shows a perspective of an arrangement with a plurality of devices according to FIG. 1.

FIG. 7 shows a typical use of the device in a mounting rack for solar systems. A plurality of supports 61 each bear a sloping supporting rail 60. Two rails 1 with a Z-shaped cross section are arranged above the supporting rails 60. The upper one of the rails 1 is fastened as previously to the supporting rails 60 by two devices. The lower one of the rails 1 still rests unfastened against the supporting rails 60. The retaining plates 10 can already be pre-mounted on the supporting rails 60 before delivery to the erection site of the mounting rack.

Figure 8:
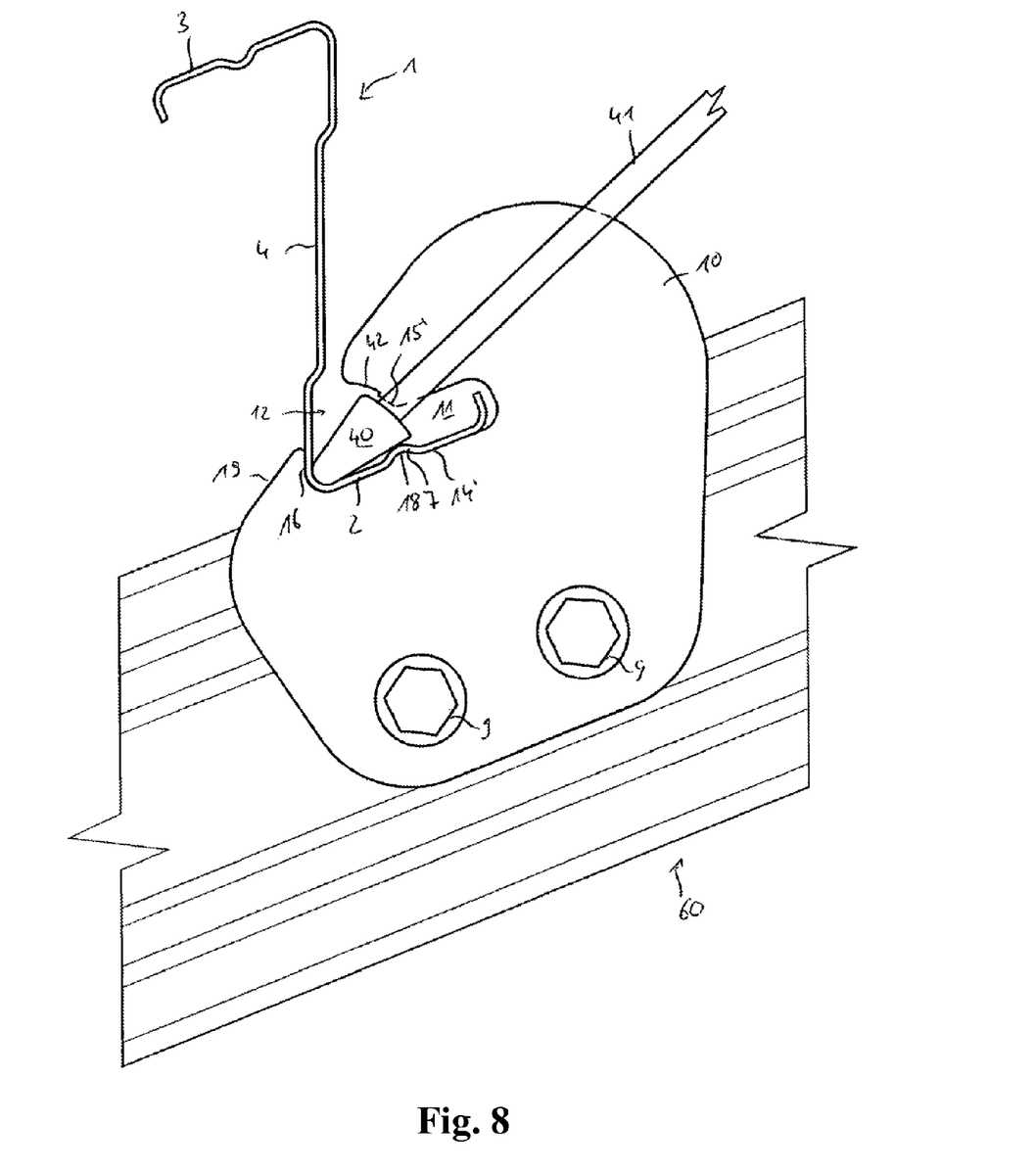
FIG. 8 shows a side view of a device in the unclamped state.
Figure 9:
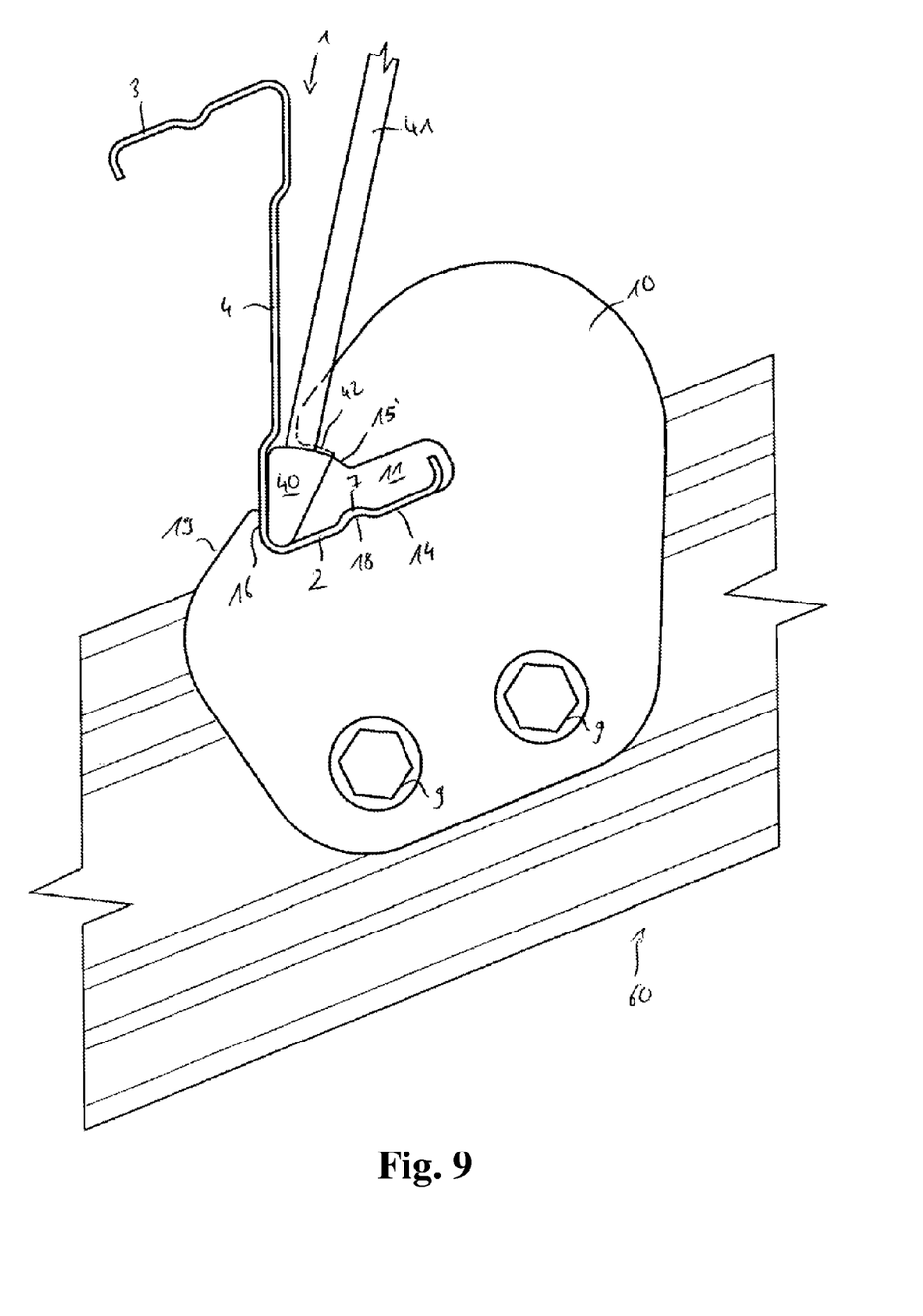
FIG. 9 shows a side view of the device according to FIG. 8 in the clamped state.

FIG. 8 and FIG. 9 show an alternative embodiment of the device, in which the screwless clamping device is designed as an eccentric 40. The above statements and reference numbers apply correspondingly to components which are identical to the previous exemplary embodiment. For the positional securing of the rail 1, the first edge portion 14' of the notch 11 has an elevation 18 which engages in a reinforcing bead 7 in the lower fastening flange 2 of the rail 1. A second edge portion 15' is arranged inclined in relation to the first edge portion 14'. The eccentric 40 is actuated by a lever 41 and can be transferred from an unclamped state according to FIG. 8 into a clamped state according to FIG. 9. The eccentric 40 here is supported rotationally in the round corner region between the lower fastening flange 2 and the central web 4 and slides on the second edge portion 15' during the actuation. The second edge portion 15' is approximately central with respect to the axis of rotation of the eccentric 40. In order to lock the eccentric 40 in an end position in the clamped state, the second edge portion 15' also has a locking depression 42. In the clamped state, the eccentric 40 presses the round corner region against the third edge portion 16 and also presses the lower fastening flange 2 against the first edge portion 14'. Since the rail 1, as in the previous exemplary embodiment, is engaged over by the third edge portion 16, the rail 1 is blocked in an interlocking manner against forces lifting off with respect to the first edge portion 14'. According to FIG. 9, the eccentric 40 abuts in the end position against the central web 4 which thereby acts as an end stop. The eccentric 40 can advantageously be designed as an extruded profile and can contain a bore for the loose insertion of the lever 41. In order to block an unintentional rotation of the rail 1, i.e., a tilting of the lower fastening flange 2 in the notch 11, the notch 11 can be designed so that the lower fastening flange 2, for example, at the outermost edge thereof, additionally abuts against the notch 11 opposite the first edge portion 14'. It should finally be noted that the positional securing of the rail 1 via the elevation 18 may also be advantageous in the preceding exemplary embodiment.

Figure 10:
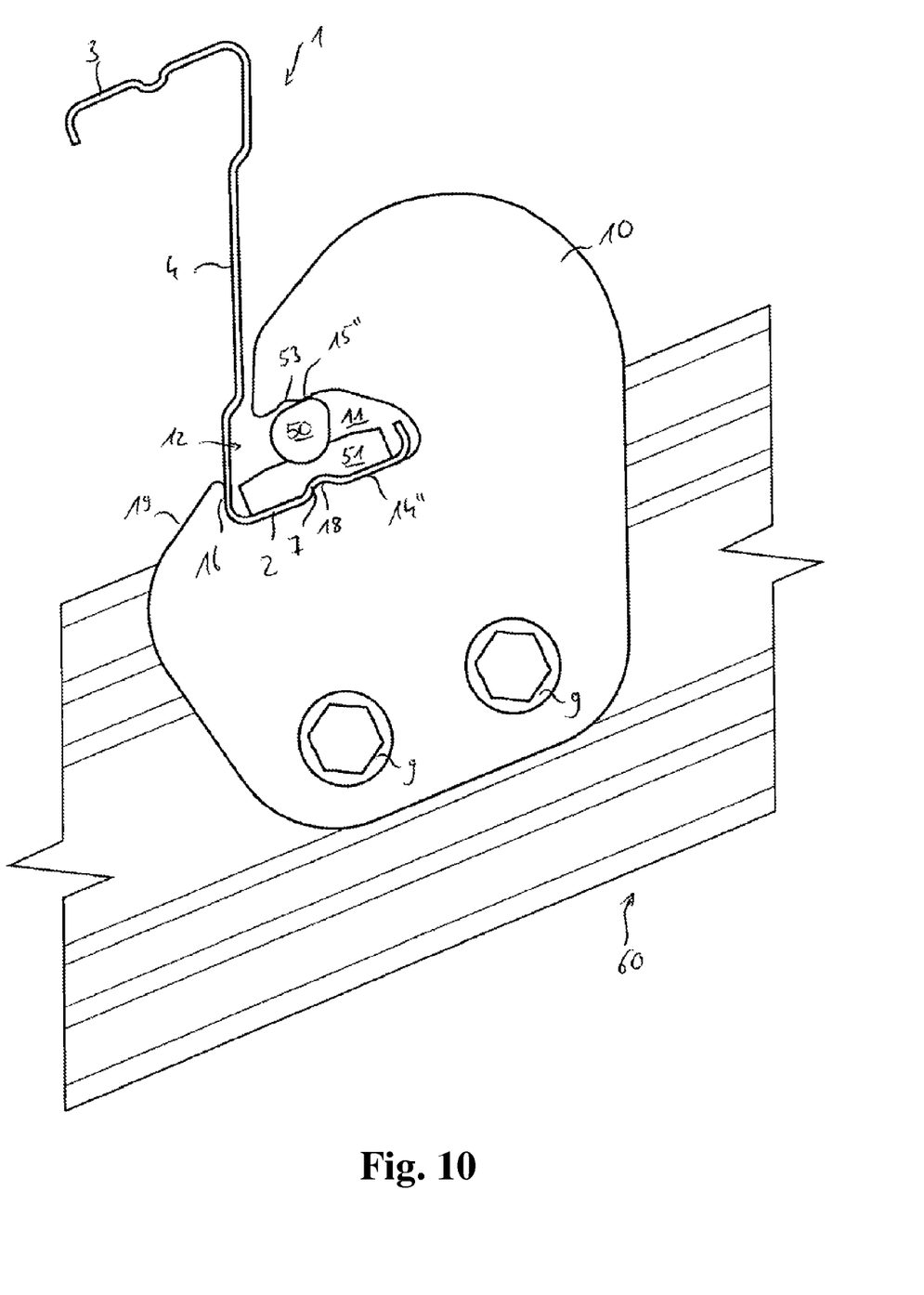
FIG. 10 shows a side view of a device in the unclamped state.
Figure 11:
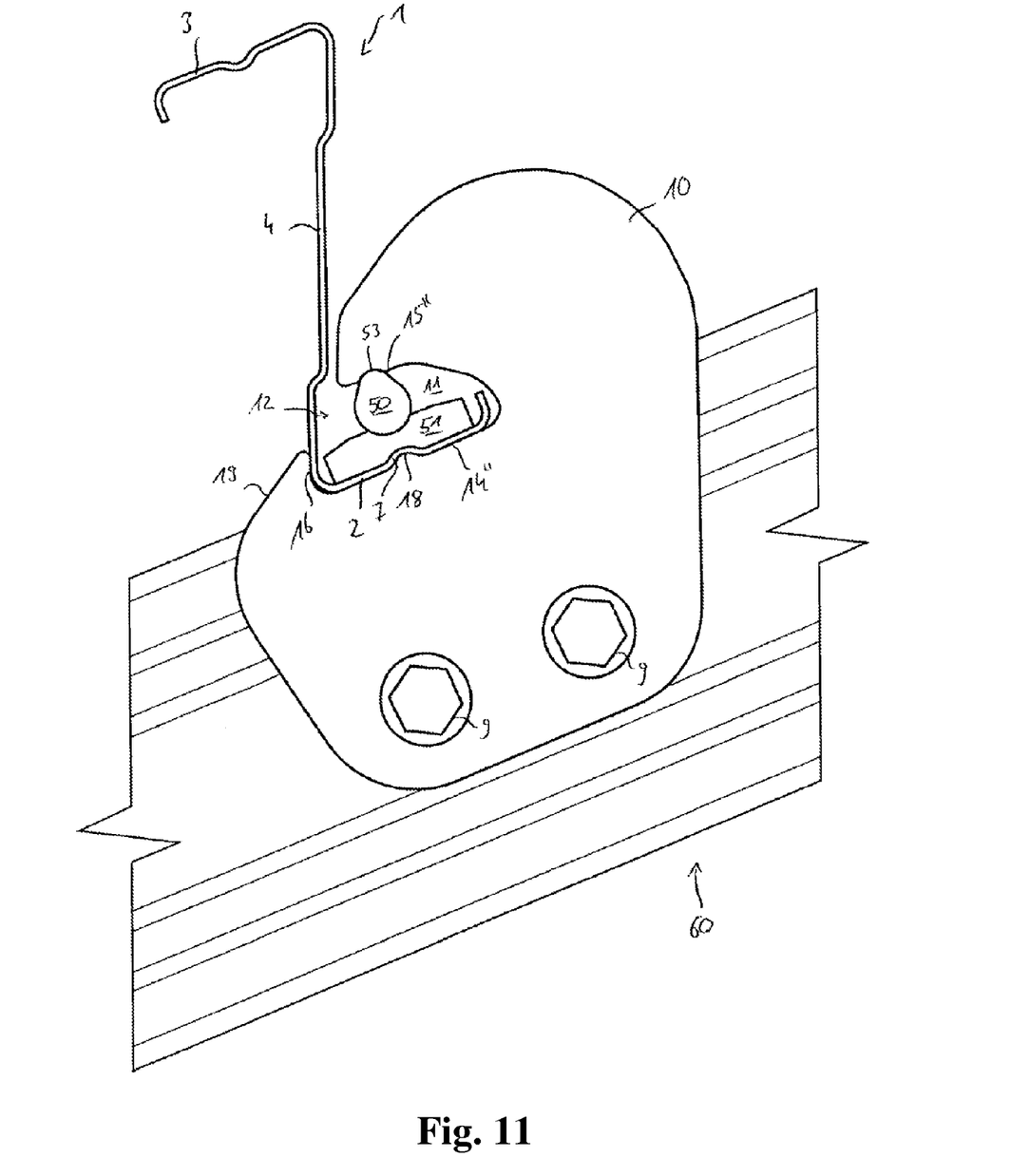
FIG. 11 shows a side view of the device according to FIG. 10 in the clamped state.

FIG. 10 and FIG. 11 show an embodiment of the device, in which the screwless clamping device again acts via an eccentric 50. The above statements and reference numbers apply correspondingly to identical components. A second edge portion 15" is arranged opposite the first edge portion 14" of the notch 11. The eccentric 50 is mounted rotationally on a supporting body 51 which is part of the screwless clamping device and rests on the lower fastening flange 2 in a positionally secured manner. The eccentric 50 can be actuated by a lever (not shown here) and can be transferred from an unclamped state according to FIG. 10 into a clamped state according to FIG. 11. During the actuation of the eccentric 50, the latter slides on the second edge portion 15". In order to lock the eccentric 50 in an end position in the clamped state, the second edge portion 15" also has a locking depression 53. In the clamped state, the eccentric 50 presses the lower fastening flange 2 against the first edge portion 14" by the supporting body 51. Since the rail 1, as in the previous exemplary embodiments, is engaged over by the third edge portion 16, the rail 1 is blocked in an interlocking manner against forces lifting off with respect to the first edge portion 14". The eccentric 50 and the supporting body 51 can advantageously be designed as an extruded profile. The eccentric 50 can contain a bore for the loose insertion of the lever.

The present invention is not limited to embodiments described herein; reference should be had to the appended claims.

What is claimed is:

1. A device for affixing a rail comprising a first fastening flange, the device comprising:
   a retaining plate comprising a notch, the notch comprising a front opening, a first edge portion, a second edge portion, and a third edge portion, the second edge portion and the first edge portion being arranged to face each other; and
   a screwless clamping device,
   wherein,
   the retaining plate is configured so that, when the rail is inserted into the notch via the first fastening flange, the rail penetrates and crosses the retaining plate and protrudes out of the notch through the front opening,
   the retaining plate is configured so that, when the rail is inserted into the notch via the first fastening flange, the first fastening flange is supported on the first edge portion,
   the screwless clamping device is configured to jam between the first fastening flange and the second edge portion and to press the first fastening flange against the first edge portion when the rail is inserted into the notch via the first fastening flange, and
   the third edge portion acts as a stop so as to block the rail from escaping from the notch in a direction parallel to the first edge portion when the rail is inserted into the notch via the first fastening flange.

2. The device as recited in claim 1, wherein the rail is a roll-formed rail with a Z-shaped cross section.

3. The device as recited in claim 2, wherein the rail comprises a second fastening flange arranged so as to be parallel to the first fastening flange, the first fastening flange and the second fastening flange being connected diagonally and integrally by a central web.

4. The device as recited in claim 1, wherein the screwless clamping device comprises a wedge, wherein the wedge is configured to jam between the first fastening flange and the second edge portion and to press the first fastening flange against the first edge portion.

5. The device as recited in claim 4, wherein the wedge comprises a locking depression and a wedge surface arranged adjacent to the locking depression.

6. The device as recited in claim 5, wherein the wedge further comprises a stop configured to block a further driving-in of the wedge, the locking depression being arranged adjacent to the stop.

7. The device as recited in claim 4, wherein the notch further comprises a stop configured to block a movement of the wedge away from the front opening.

8. The device as recited in claim 1, wherein the screwless clamping device comprises an eccentric.

9. The device as recited in claim 1, wherein the screwless clamping device comprises an expanding body comprising a swellable material, the swellable material being activatable in a controlled manner.

10. The device as recited in claim 1, wherein the third edge portion is configured to at least partially engage over the rail with respect to the first edge portion.

11. The device as recited in claim 1, wherein the notch is configured to be adapted to the first fastening flange so that the rail is insertable via the first fastening flange frontally through the front opening into the notch.

12. The device as recited in claim 1, wherein the notch is configured to be matched to the first fastening flange so that the rail is insertable via the first fastening flange frontally through the front opening into the notch via only a combined pivoting and sliding movement.

13. A rail cross connection comprising:
the device as recited in claim 1; and
a supporting rail,
wherein, the supporting rail is arranged to cross the rail and to have the retaining plate be fastened thereto.

14. The rail cross connection as recited in claim 13, wherein the second edge portion is configured to run parallel to the supporting rail.

15. A method for producing the rail cross connection as recited in claim 13, the method comprising:
fastening the retaining plate to the supporting rail;
inserting the rail so that the first fastening flange crosses the notch;
placing the rail so that the first fastening flange is supported on the first edge portion;
positioning the screwless clamping device between the first fastening flange and the second edge portion; and
actuating the screwless clamping device.

16. The method as recited in claim 15, wherein, between the fastening step and the inserting step, the method further comprises transporting the supporting rail and the retaining plate to a building site.

17. The method as recited in claim 15, wherein the inserting step is performed by inserting the first fastening flange of the rail frontally through the front opening.

18. The method as recited in claim 17, wherein the inserting of the rail is performed via a combined pivoting and sliding movement.

19. The method as recited in claim 15, wherein, during or after the placing step, the rail is positioned against the third edge portion or abuts against the third edge position due to gravity.

* * * * *